(12) United States Patent
Abaie et al.

(10) Patent No.: US 10,578,797 B2
(45) Date of Patent: Mar. 3, 2020

(54) HOLLOW CORE OPTICAL FIBER WITH LIGHT GUIDING WITHIN A HOLLOW REGION BASED ON TRANSVERSE ANDERSON LOCALIZATION OF LIGHT

(71) Applicant: STC.UNM, Albuquerque, NM (US)

(72) Inventors: Behnam Abaie, Albuquerque, NM (US); Arash Mafi, Albuquerque, NM (US)

( * ) Notice: Subject to any disclaimer, the term of this patent is extended or adjusted under 35 U.S.C. 154(b) by 0 days.

(21) Appl. No.: 16/254,970

(22) Filed: Jan. 23, 2019

(65) Prior Publication Data

US 2019/0227226 A1 Jul. 25, 2019

Related U.S. Application Data

(60) Provisional application No. 62/621,399, filed on Jan. 24, 2018.

(51) Int. Cl.
*G02B 6/02* (2006.01)
(52) U.S. Cl.
CPC ..... *G02B 6/02304* (2013.01); *G02B 6/02328* (2013.01); *G02B 6/02342* (2013.01); *G02B 6/02361* (2013.01)
(58) Field of Classification Search
None
See application file for complete search history.

(56) References Cited

U.S. PATENT DOCUMENTS

| 3,870,399 | A | * | 3/1975 | Randall | G02B 6/06 |
| | | | | | 385/116 |
| 5,471,553 | A | * | 11/1995 | Teshima | A61B 1/00165 |
| | | | | | 385/125 |
| 6,463,200 | B2 | * | 10/2002 | Fink | G02B 6/02304 |
| | | | | | 385/123 |
| 2004/0071423 | A1 | * | 4/2004 | Libori | C03B 37/0122 |
| | | | | | 385/127 |
| 2004/0137168 | A1 | * | 7/2004 | Fuflyigin | C03B 37/0183 |
| | | | | | 427/571 |

(Continued)

FOREIGN PATENT DOCUMENTS

WO WO 2010/127676 A1 * 11/2010

OTHER PUBLICATIONS

S. Karbasi et al. Detailed investigation of the impact of the fiber design parameters on the transverse Anderson localization of light in disordered optical fibers. Optics Express, 20:17:18692-18706, Aug. 13, 2012. (Year: 2012).*

(Continued)

*Primary Examiner* — Michael Stahl
(74) *Attorney, Agent, or Firm* — MH2 Technology Law Group, LLP

(57) ABSTRACT

A hollow core optical fiber guide is provided that comprises a body for reflecting light comprising a first end, a second end, a longitudinal dimension extending between the first end and the second end, an inner sidewall, an outer sidewall, and a transverse dimension extending radially between the inner sidewall and the outer sidewall, wherein the body comprises a plurality of optically dielectric material and each of the plurality of dielectric material having a different refractive index; and a light guiding core region disposed within the body.

15 Claims, 3 Drawing Sheets

(56) References Cited

U.S. PATENT DOCUMENTS

| | | | |
|---|---|---|---|
| 2005/0094954 A1* | 5/2005 | Pickrell | C03B 37/01297 385/123 |
| 2005/0232560 A1* | 10/2005 | Knight | C03B 37/0122 385/125 |
| 2005/0232561 A1* | 10/2005 | Murofushi | G02B 6/02033 385/125 |
| 2006/0165361 A1* | 7/2006 | Hongo | G02B 6/02328 385/125 |
| 2006/0193583 A1* | 8/2006 | Dong | C03B 37/01205 385/127 |
| 2006/0263023 A1* | 11/2006 | Harrington | G02B 6/02304 385/125 |
| 2007/0147752 A1* | 6/2007 | Weisberg | A61B 18/201 385/123 |
| 2010/0176200 A1* | 7/2010 | Vollmer | G01N 21/774 235/462.01 |
| 2013/0195410 A1* | 8/2013 | Karbasivalashani | G02B 6/02338 385/124 |
| 2016/0070059 A1* | 3/2016 | Chen | C03B 37/15 385/125 |
| 2017/0016996 A1* | 1/2017 | Welker | B29D 11/00682 |

OTHER PUBLICATIONS

A. Mafi. Transverse Anderson localization of light: a tutorial. Advances in Optics and Photonics, 7:459-515, Sep. 2015. (Year: 2015).*

* cited by examiner

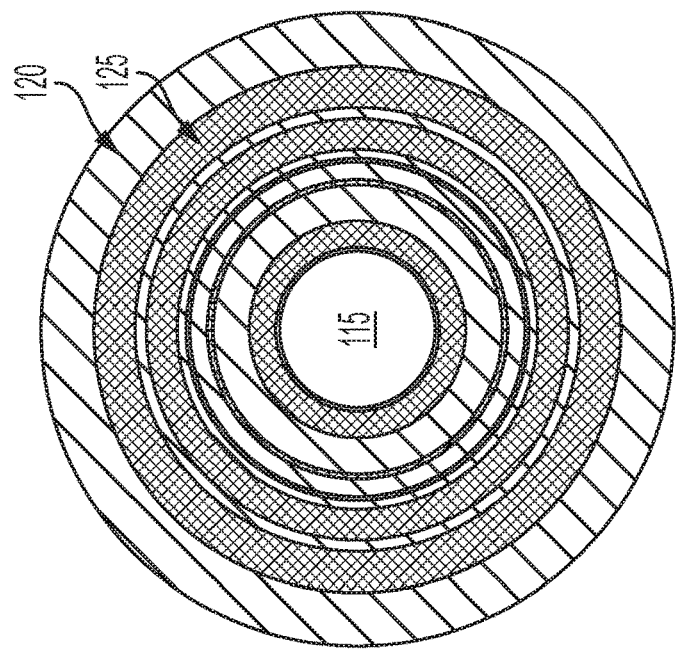
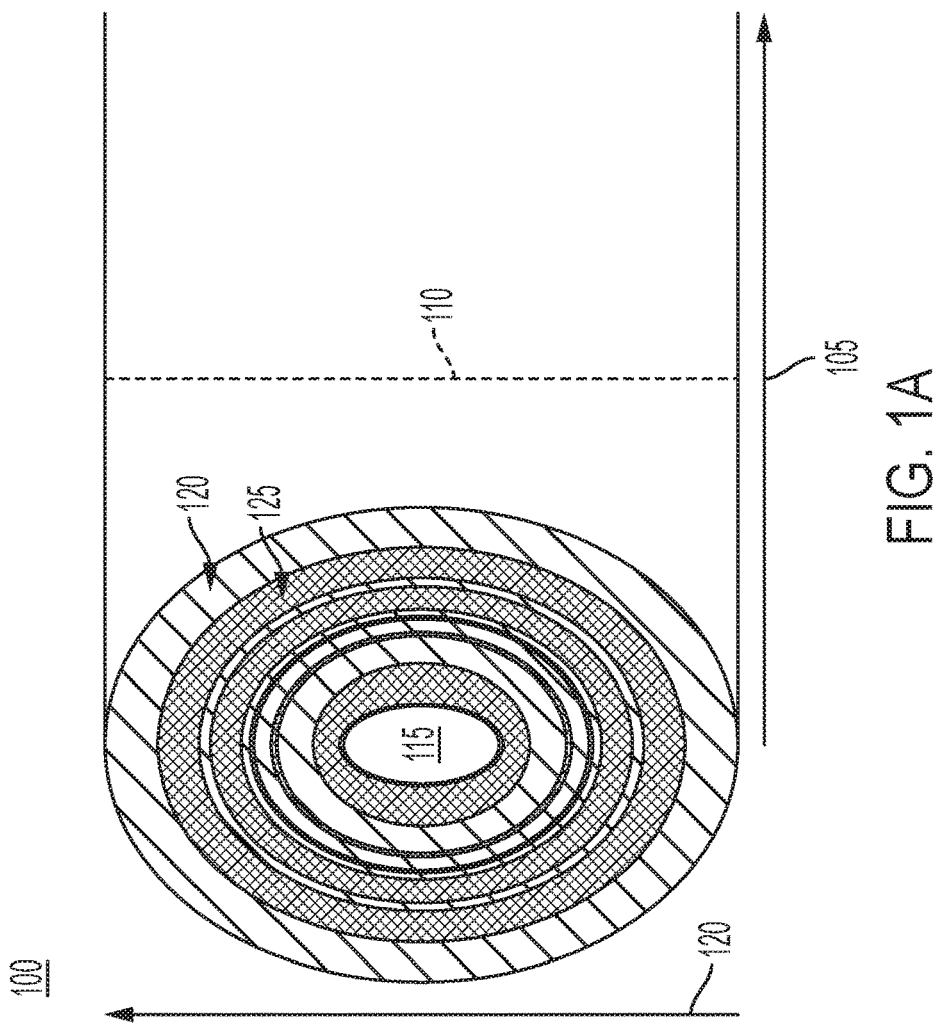
FIG. 1A
FIG. 1B

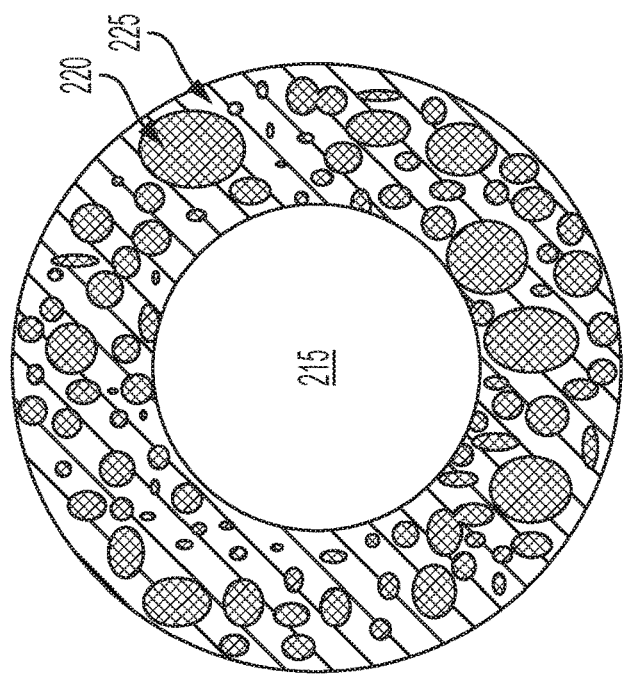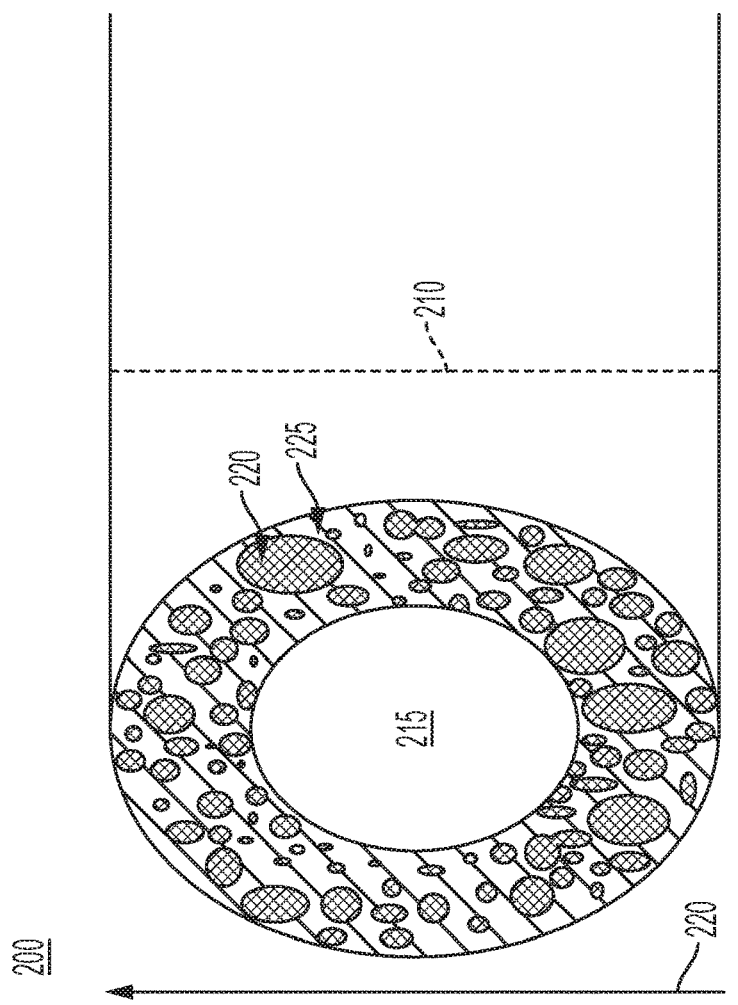
FIG. 2B
FIG. 2A

HOLLOW CORE OPTICAL FIBER WITH LIGHT GUIDING WITHIN A HOLLOW REGION BASED ON TRANSVERSE ANDERSON LOCALIZATION OF LIGHT

CROSS REFERENCE TO RELATED APPLICATIONS

This application claims benefit of priority to U.S. provisional application 62/621,399 filed on Jan. 24, 2018, the entirety of which is hereby incorporated by reference.

FIELD

The present teachings generally relate to optical fibers, and more particularly to hollow core optical fibers with light guiding within a hollow region based on transverse Anderson localization of light.

BACKGROUND

Anti-resonant HCF light guidance relies on inhibited coupling between core and cladding modes and anti-resonance effects at the core/cladding interface. Various types of antiresonant HCFs have been proposed, including Kagome fibers, negative curvature fibers and non-touching capillary fibers. In these fibers, the thickness of the core/cladding interface is designed to be in antiresonance at the wavelength of operation such that the electromagnetic field is pushed into the hollow-core. The antiresonant glass membrane is very effective at repelling light away from the cladding. Therefore, surface scattering loss and damage threshold are significantly improved. However, confinement losses and bend sensitivity limit their maximum transmittable power.

Anderson localization is the absence of diffusive transport of waves in a highly disordered medium. In order to observe Anderson localization, the disorder must be strong enough that the wave scattering transport length l* becomes of the order of the wavelength, i.e., kl*~1, where k is the effective wave vector in the medium. While it can be difficult to satisfy this condition and observe strong localization effects for light in three dimensions, the required conditions are relaxed in two-dimensional systems. Two-dimensional disordered systems are always localized, and the localization length $\xi$, which is the effective width of the localized beam, is related to l* by $\xi = l^* \exp(\pi k_T l^*/2)$. If the randomness in the refractive index profile is only limited to the transverse plane of an optical wave, the effective transverse component of the wave vector $k_T$ is 10-100 times smaller than k; therefore, even small disorder (i.e., large l*) can result in a beam diameter that is smaller than the transverse dimensions of the system.

A hollow core optical fiber guides light within a hollow region where only a very small portion of optical power propagates inside the solid fiber material, which is typically made of glass. This helps to minimize nonlinear effects and provides a significantly higher damage threshold. Light guiding within a hollow core is not possible with conventional optical fiber designs which work based on total internal reflection. However, a different guiding mechanism can be used, based on a photonic bandgap, as can be realized in a photonic crystal fiber with a certain structure.

What is needed is an improved optical fiber that addresses the above-noted issues.

SUMMARY

In accordance with examples of the present disclosure, a hollow core optical fiber guide is provided that comprises a body for reflecting light comprising a first end, a second end, a longitudinal dimension extending between the first end and the second end, an inner sidewall, an outer sidewall, and a transverse dimension extending radially between the inner sidewall and the outer sidewall, wherein the body comprises a plurality of optically dielectric material and each of the plurality of dielectric material having a different refractive index; and a light guiding core region disposed within the body.

In accordance with examples of the present disclosure, a hollow core optical fiber guide is provided that comprises a body for reflecting light comprising a first end, a second end, a longitudinal dimension extending between the first end and the second end, an inner sidewall, an outer sidewall, and a transverse dimension extending radially between the inner sidewall and the outer sidewall, wherein the body comprises a first optically dielectric material having a first refractive index and a second optically dielectric material having a second refractive index, wherein the first refractive index is higher than the second refractive index and the first optically dielectric material and the second optically dielectric material are distributed in the body as alternating concentric regions; and a light guiding core region disposed within the body.

In accordance with examples of the present disclosure, a hollow core optical fiber guide is provided that comprises a body for reflecting light comprising a first end, a second end, a longitudinal dimension extending between the first end and the second end, an inner sidewall, an outer sidewall, and a transverse dimension extending radially between the inner sidewall and the outer sidewall, wherein the body comprises a first optically dielectric material having a first refractive index and a second optically dielectric material having a second refractive index, wherein the first refractive index is higher than the second refractive index and the first optically dielectric material comprises a matrix and the second optically dielectric material is randomly distributed in the matrix as a plurality of discrete regions; and a light guiding core region disposed within the body.

Various aspects of the present disclosure provide one or more of the following features. The body comprises an annular shape and the light guiding core region comprises a hollow portion of the annular-shaped body. The light guiding core region extends in longitudinally within the body. Light traveling through the optical fiber guide is confined in a transverse direction by the body and propagates in a longitudinal direction through the light guiding core region. The plurality of optically dielectric materials comprises at least two selected from air, glass, polymers, or combinations thereof. The plurality of materials comprises a first material having a first refractive index and a second material comprising a second refractive index that is different than the first refractive index. The first material comprises a matrix and the second material is randomly distributed in the matrix as a plurality of discrete regions. The plurality of discrete regions comprise at least two similar or different feature sizes. Light entering the body from the light guiding core region remains confined to the light guiding core region because of multiple reflections from the inner sidewall. The second material comprises at least one region disposed between two regions of the first material. The first material and the second material are distributed in the body as alternating concentric regions. An operation bandwidth is 300 nm to 12,000 nm, 200 nm to 400 nm, or 300 nm to 600 nm.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures:

FIG. 1A shows a first waveguide according to examples of the present disclosure.

FIG. 1B shows a cross-section along line 110 of FIG. 1A.

FIG. 2A shows second waveguide according to examples of the present disclosure.

FIG. 2B shows a cross-section along line 210 of FIG. 2A.

Figure 3A:
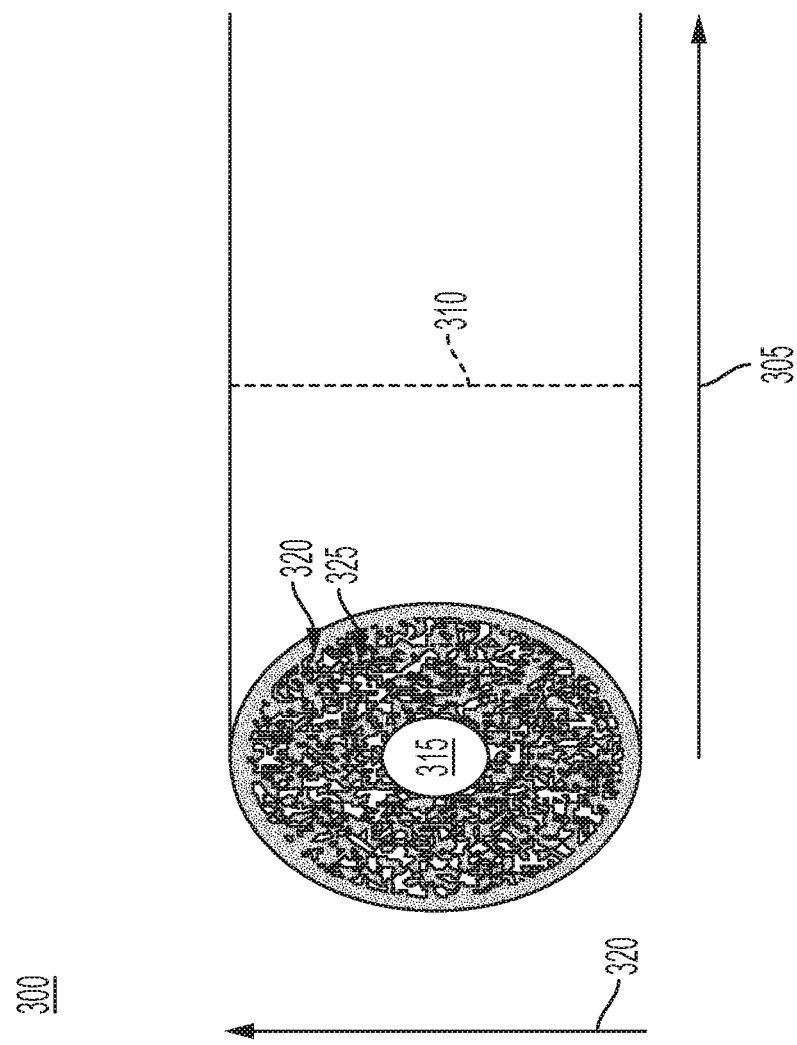
FIG. 3A shows second waveguide according to examples of the present disclosure.

It should be noted that some details of the figures have been simplified and are drawn to facilitate understanding of the present teachings rather than to maintain strict structural accuracy, detail, and scale.

DETAILED DESCRIPTION

One issue with a photonic crystal fiber is the normally quite limited wavelength range in which the photonic bandgap guiding works. This wavelength range can be broadened by using transverse Anderson localization of light. In this mechanism, light can be confined within a hollow core region surrounded by a stack of random dielectric materials due to multiple scattering where light confinement is less sensitive to the wavelength of light in contrast with the photonic bandgap guidance.

A hollow core fiber (HCF) is disclosed based on highly disordered cladding structures. The HCF allows for large core diameter for a given wavelength, as well as short wavelengths for a fixed core diameter. The high level of disorder in the cladding allows for the expansion of the transmission bandwidth compared to conventional hollow core photonics crystal fibers (HC-PCF). For example, HC-800B sold by Thorlabs, Inc. has 7.5 micron hollow core and can transmit in the wavelength range of 770-870 nm. According to the present disclosure, the HFC can have a core diameter of about 5 microns to about 100 microns that can be used to transmit a broad range of wavelengths from about 400 nm to about 2000 nm. Due to the disordered cladding structure of the HCF, the HCF can have reduced bend sensitivity with a marcobending radius of less than 5 mm without showing increased loss. HCF fabrication is easier and is a better reproducible fabrication process compared to the highly complex manufacturing techniques necessary to produce complicated structures as discussed below.

Transverse Anderson Localization is the propagation of a ray transported through a transversely disordered but longitudinally consistent material. This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

The example HCFs discussed below are optical fibers with a binary compound that has a permanent refractive index fluctuations of the order of about 0.05 to about 1.0. Examples include fibers made from binary polymer compounds with refractive index fluctuations of about 0.1, and glass-air structures with refractive index fluctuations of about 0.5. If the fibers are designed to operate as single-mode over a certain wavelength range, then the core diameters and the effective propagating beam diameter will be about 3 to about 10 times the center wavelength of light for which confinement is intended and the actual values depends on the design and the size of refractive index fluctuations. The core size and beam diameter is comparable to HC-PCF designs. In some examples, the transverse size of each random element of the binary compound can be around 0.5 times the center wavelength of light for which confinement is intended. In some designs of HCFs, the refractive index is invariant in the longitudinal z-direction, but is randomly changing in the two "transverse" directions, such that the correct length of the transverse refractive index profile is comparable to the size of the individual random components. In other words, the refractive index is random and the refractive index of two points separated by approximately one wavelength are statistically uncorrelated. In some examples, the core diameters can gradually decrease or increase along the fiber to allow for the expansion or contraction of the beam. The light from common lasers in the visible and near-infrared can propagate through these fibers. If appropriate materials are used, a HCF can guide infrared light in the 10 micron wavelength range generated by $CO_2$ lasers as well. If the HCF refractive index is properly maintained in the longitudinal direction with minimal fluctuation, the HCF can provide guidance with attenuation as low as 3 dB/km. In other words, the light can propagate in the core over one kilometer length with only 50% loss of power. One benefit of using the HCF over conventional index guiding fibers is that the light has little overlap with fiber material and does not suffer as much from nonlinearities and potential damage issues related to high power. Moreover, the light propagates nearly 1.5 times faster in HCF, because the light propagates in a hollow core rather than a glass or polymer with a larger than unity refractive index of typically around 1.5. One benefit of using the HCF over HC-PCF is its broad bandwidth compared with HC-PCF and also relative ease of fabrication. The beam profile resembles that of HC-PCF and is not much different from a conventional index-guiding fiber.

FIG. 1A shows a first example of a waveguide 100, according to the present disclosure. FIG. 1B shows a cross section of FIG. 1A along line 110. Waveguide 100 is configured using Anderson localization based hollow core fibers. Waveguide 100 is an arrangement of materials that provides longitudinal waveguiding along a transmission axis 105. The center of waveguide 100 is an air hollow region 115 where light is confined in the transverse direction and propagates in a longitudinal direction 120 along the transmission axis 105. Waveguide 100 is composed of two different and alternating materials with different refractive indexes. The difference in refractive indexes can be about 0.1 or higher. The range in refractive indexes for the materials of the waveguide 100 can be from about 1.00 to about 5.00. The types of materials can include, but are not limited to, air with a refractive index of 1.00, silica aerogel with a refractive index range of about 1.02 to about 1.30, glass/fused silica with a refractive index range of about 1.30 to about 2.0, and polymers with a refractive index range of about 2.0 to about 5.0.

In one non-limiting example, the high refractive index material is polystyrene (PS) with a refractive index of 1.59 and the low refractive index material is poly(methyl methacrylate) (PMMA) with a refractive index of 1.49. In another non-limiting example, the high refractive index material is glass with a refractive index of 1.49 and the low refractive index material is air with a refractive index of 1.00. These materials are randomly distributed around the air hollow region, so that light entering from the hollow core to the random media is bounced back and confined to the hollow core and propagates in a direction perpendicular to this page.

Notice that the feature size of the random scatters is critical and has been exaggerated here for an easier demonstration.

FIG. 2A shows a second example of a waveguide 200, according to the present disclosure. FIG. 2B shows a cross section of FIG. 2A along line 210. Waveguide 200 is configured using Anderson localization based hollow core fibers. Waveguide 200 is an arrangement of materials that provides longitudinal waveguiding along a transmission axis 205. The center of waveguide 200 is an air hollow region 215 where light is confined in the transverse direction and propagates in a longitudinal direction 220 along the transmission axis 205. Waveguide 200 is composed of two different and alternating materials with different refractive indexes.

Figure 3B:
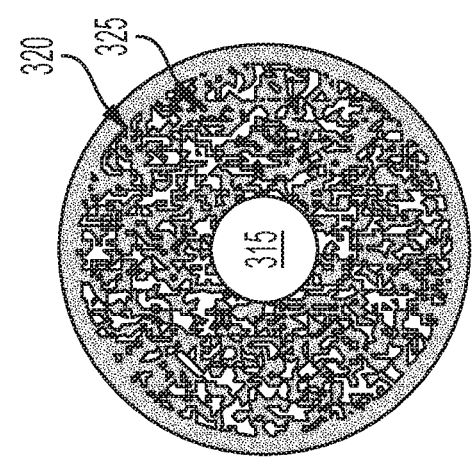
FIG. 3B shows a cross-section along line 310 of FIG. 3A.

FIG. 3A shows a second example of a waveguide 300, according to the present disclosure. FIG. 3B shows a cross section of FIG. 3A along line 310. Waveguide 300 is configured using Anderson localization based hollow core fibers. Waveguide 300 is an arrangement of materials that provides longitudinal waveguiding along a transmission axis 305. The center of waveguide 300 is an air hollow region 315 where light is confined in the transverse direction and propagates in a longitudinal direction 320 along the transmission axis 305. Waveguide 300 is composed of two different and alternating materials with different refractive indexes. In this example, waveguide 300 comprises disordered cladding. Using a 1D disordered example, it has been showed that the partial transverse disorder results in an ultra-broad bandgap. Ultra-broad bandgap is at least one octave, where a one octave bandgap is a bandgap where the longest wavelength in the bandgap is twice the shortest wavelength. For example, if the bandgap is in the wavelength range of about 400 nm to about 800 nm, then it is one octave. The bandgap is similar in nature to that obtained in a periodic photonic crystal, albeit weaker, meaning that more layers of disordered structure are required to confine the light. So, a HCF can be constructed with acceptable light confinement properties within a typical size fiber structure. The relative weakness in the bandgap strength is compensated by a much broader bandwidth, such as about 2 to about 10 times broader than that of HC-PCFs. The bandgap can be made stronger by increasing the thickness of the disordered cladding, for example the increased thickness for optical fibers can be of the range of about 60 microns to about 200 microns. The waveguide 300 with a cladding that is transversely disordered (submicron random structure) and a hollow-core can support propagating beams over a long propagation distance and a large wavelength span. Distances can vary from meters to about 1 kilometer to about 2 kilometers and wavelength span can be about 400 nm to about 2000 nm. The hollow-core disordered cladding fiber can be used to transport high power beams while reducing the heating load such that the fiber structure temperature remains below about 100 degree Celsius. It can also be used to transport infrared laser beams for which material attenuation is often very high. The fabrication of the hollow-core fiber is similar to the photonic bandgap fiber (HC-PBGF) using, for example, a stack-and-draw method where capillaries or fibers of different indexes are stacked into a lattice and drawn into an optical fiber. However, unlike the PBGF whose cladding is an ordered lattice, the cladding of the disclosed hollow-core fiber is highly disordered resulting in much increased fabrication tolerances.

In one non-limiting example, the waveguides of FIGS. 1-3 can be formed using a stack-and-draw method. Using this method, for the waveguide of FIG. 1, a preform is made by randomly stacking a set of fitted hollow capillary tubes, each with a random thickness and alternating with the two refractive indexes. For FIGS. 2 and 3, a preform is made by randomly stacking fibers comprising the two different refractive indexes around a hollow capillary tube, and then re-drawing into a fiber. The number of fibers of each refractive index can range from 1,000 to 1,000,000. The hollow capillary tube is pressurized to ensure that it does not collapse under pressure. In another non-limiting example, two concentric capillary tubes of different diameters can be placed where the inner one make the core and the space between the capillaries can be filled with random fibers of the two components, or with random spheres of the two components. After the drawing, the spheres are elongated to random fibers to provide the required transverse randomness.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A hollow core optical fiber guide, comprising:
   a body for reflecting light comprising a first end, a second end, a longitudinal dimension extending between the first end and the second end, an inner sidewall, an outer sidewall, and a transverse dimension extending radially between the inner sidewall and the outer sidewall, wherein the body comprises a plurality of optically dielectric materials and each of the plurality of optically dielectric materials having a different refractive index that produces a transversely disordered and longitudinally invariant refractive index profile; and
   a hollow light guiding core region disposed within the body, wherein the hollow light guiding core region has a core diameter of about 5 microns to about 100 microns that is configured to transmit an optical beam having a wavelength from about 400 nm to about 2000 nm.

2. The hollow core optical fiber guide of claim 1, wherein the body comprises an annular shape and the light guiding core region comprises a hollow portion of the annular-shape.

3. The hollow core optical fiber guide of claim 2, wherein the light guiding core region extends in longitudinally within the body.

4. The hollow core optical fiber guide of claim 2, wherein light traveling through the hollow core optical fiber guide is confined in a transverse direction by the body and propagates in a longitudinal direction through the hollow core light guiding core region.

5. The hollow core optical fiber guide of claim 1, wherein the plurality of optically dielectric materials comprise at least two selected from air, glass, polymers, or combinations thereof.

6. The hollow core optical fiber guide of claim 1, wherein the plurality of optically dielectric materials comprise a first material having a first refractive index and a second material comprising a second refractive index that is different than the first refractive index.

7. The hollow core optical fiber guide of claim 6, wherein the first material comprises a matrix and the second material is randomly distributed in the matrix as a plurality of discrete regions.

8. The hollow core optical fiber guide of claim 7, wherein the plurality of discrete regions comprise at least two different highly random second material sizes.

9. The hollow core optical fiber guide of claim 6, wherein light entering the body from the light guiding core region remains confined to the light guiding core region because of multiple reflections from the inner sidewall.

10. The hollow core optical fiber guide of claim 6, wherein the second material comprises at least one region disposed between two regions of the first material.

11. The hollow core optical fiber guide of claim 10, wherein the first material and the second material are distributed in the body as alternating concentric regions.

12. A hollow core optical fiber guide, comprising:
    a body for reflecting light comprising a first end, a second end, a longitudinal dimension extending between the first end and the second end, an inner sidewall, an outer sidewall, and a transverse dimension extending radially between the inner sidewall and the outer sidewall, wherein the body comprises a first optically dielectric material having a first refractive index and a second optically dielectric material having a second refractive index, wherein the first refractive index is higher than the second refractive index and the first optically dielectric material and the second optically dielectric material are distributed in the body as alternating concentric regions that produces a transversely disordered and longitudinally invariant refractive index profile; and
    a hollow light guiding core region disposed within the body, wherein the hollow light guiding core region has a core diameter of about 5 microns to about 100 microns that is configured to transmit an optical beam having a wavelength from about 400 nm to about 2000 nm.

13. A hollow core optical fiber guide, comprising:
    a body for reflecting light comprising a first end, a second end, a longitudinal dimension extending between the first end and the second end, an inner sidewall, an outer sidewall, and a transverse dimension extending radially between the inner sidewall and the outer sidewall, wherein the body comprises a first optically dielectric material having a first refractive index and a second optically dielectric material having a second refractive index, wherein the first refractive index is higher than the second refractive index and the first optically dielectric material comprises a matrix and the second optically dielectric material is randomly distributed in the matrix as a plurality of discrete regions that produces a transversely disordered and longitudinally invariant refractive index profile; and
    a hollow light guiding core region disposed within the body, wherein the hollow light guiding core region has a core diameter of about 5 microns to about 100 microns that is configured to transmit an optical beam having a wavelength from about 400 nm to about 2000 nm.

14. The hollow core optical fiber guide of claim 13, wherein the plurality of discrete regions comprise at least two different sizes.

15. The hollow core optical fiber guide of claim 13, wherein the first optically dielectric material and the second optically dielectric material comprise at least two materials selected from air, glass, polymers, or combinations thereof.

* * * * *